(12) United States Patent
Lee et al.

(10) Patent No.: US 8,522,537 B2
(45) Date of Patent: Sep. 3, 2013

(54) EXHAUST HEAT RECOVERY DEVICE

(75) Inventors: Jae Heon Lee, Gyeonggi-Do (KR);
Byung Soon Min, Gyeonggi-Do (KR);
Seok Joon Kim, Gyeonggi-Do (KR);
Hyung Seuk Ohn, Gyeonggi-Do (KR);
Jae Young Choi, Seoul (KR)

(73) Assignees: Hyundai Motor Company, Seoul (KR);
Kia Motors Corporation, Seoul (KR)

( * ) Notice: Subject to any disclaimer, the term of this patent is extended or adjusted under 35 U.S.C. 154(b) by 302 days.

(21) Appl. No.: 12/853,780

(22) Filed: Aug. 10, 2010

(65) Prior Publication Data

US 2011/0131961 A1 Jun. 9, 2011

(30) Foreign Application Priority Data

Dec. 4, 2009 (KR) .................. 10-2009-0119661

(51) Int. Cl.
*F01N 3/02* (2006.01)

(52) U.S. Cl.
USPC .............................. 60/320; 60/298

(58) Field of Classification Search
USPC .................................. 60/298, 320
See application file for complete search history.

(56) References Cited

U.S. PATENT DOCUMENTS

| 5,314,009 | A | * | 5/1994 | Yates et al. | ............ | 165/72 |
| 5,651,342 | A | * | 7/1997 | Hara | ............ | 123/339.24 |
| 6,062,304 | A | | 5/2000 | Kremer et al. | | |
| 6,151,891 | A | * | 11/2000 | Bennett | ............ | 60/298 |
| 2009/0038302 | A1 | * | 2/2009 | Yamada et al. | ............ | 60/320 |
| 2012/0144814 | A1 | * | 6/2012 | Won et al. | ............ | 60/320 |

FOREIGN PATENT DOCUMENTS

| JP | 2005-226474 A | | 8/2005 |
| JP | 2007-247556 A | | 9/2007 |
| JP | 2007-285260 A | | 11/2007 |
| KR | 2001055204 | * | 7/2001 |
| WO | 2004-042310 A1 | | 5/2004 |

\* cited by examiner

*Primary Examiner* — Thomas Denion
*Assistant Examiner* — Patrick Maines
(74) *Attorney, Agent, or Firm* — Edwards Wildman Palmer LLP; Peter F. Corless

(57) ABSTRACT

The present invention provides an exhaust heat recovery device configured to perform heat exchange between three media such as, exhaust gas, coolant, and oil. According to preferred embodiments of the present invention, the exhaust heat recovery device is configured such that the heat of exhaust gas discharged from an engine is transmitted to the coolant and the oil at the same time and direct heat exchange between the coolant and the oil is made, thereby simultaneously increasing the temperature of the coolant and the oil during the initial start-up of the engine (fast warm-up). As a result, it is possible to reduce friction loss of powertrain, thereby improving fuel efficiency. Accordingly, an object of the present invention is to provide an exhaust heat recovery device which is configured to perform the integral heat exchange between the exhaust gas, the coolant, and the oil.

18 Claims, 9 Drawing Sheets

EXHAUST HEAT RECOVERY DEVICE

CROSS-REFERENCE TO RELATED APPLICATION

This application claims under 35 U.S.C. §119(a) the benefit of Korean Patent Application No. 10-2009-0119661 filed Dec. 4, 2009, the entire contents of which are incorporated herein by reference.

BACKGROUND (a) Technical Field

The present disclosure relates in general to an exhaust heat recovery device. More particularly, it relates to an exhaust heat recovery device, which recovers and reuses waste heat of exhaust gas that is discharged from an engine of a vehicle.

(b) Background Art

Recently, research has been aimed at improving fuel efficiency by recovering and reusing energy discharged from a vehicle.

Examples of technologies of recovering or reusing waste energy include:

(1) Thermoelectric conversion technology and thermoacoustic conversion technology using waste heat;

(2) Piezoelectric technology and electromagnetic induction technology using vibration and sound generated by the vehicle; and (3) Wind energy regeneration technology using aerodynamic movement, regenerative shock absorber technology using aerodynamic perturbation, and nanogenerator technology using vortex energy.

A typical example of the energy recovery and reuse technology applied to the vehicle is an exhaust heat recovery device.

Japanese Patent Publication No. 2007-247556, incorporated by reference in its entirety herein, discloses an exhaust heat recovery device, which recovers waste heat of exhaust gas by heat exchange between the exhaust gas, which flows through a bypass channel in a housing, and a coolant medium, which flows through a coolant medium channel provided adjacent to the exhaust channel.

For example, FIG. 1 shows an exhaust heat recovery device, which recovers exhaust heat by heat exchange between exhaust gas and coolant.

These exhaust heat recovery devices recover the waste heat of the exhaust gas discharged from the engine by heat exchange with the coolant to improve heating performance. Further, during initial start-up, the temperature of the engine is rapidly increased with the coolant heat-exchanged with the exhaust gas to suitably reduce the friction of the engine, thus improving fuel efficiency.

In addition to the above-described exhaust heat recovery devices, some of the fields in which the research and development for recovery of waste energy is carried out include the construction of a secondary steam engine or a thermoelectric element using the exhaust heat, for example, as follows:

(1) Systems comprising a compounded steam engine including a condenser and an expander and using the energy derived from the steam engine;

(2) Steam turbines as a secondary steam engine using exhaust heat including a condenser, an expander, and first and second superheaters and technology for converting the power generated by the steam turbine into energy for driving the vehicle; and (3) Systems in which a thermoelectric element using the Peltier-Seebec effect which generates electricity from a temperature difference between the exhaust heat and the environment is mounted in an exhaust system to utilize the electricity generated therefrom.

However, the technology which uses the exhaust heat in the secondary steam engine and the thermoelectric element have a considerably increased weight and a change in structure, and the technology which uses the thermoelectric element has a low energy density and a high back pressure. Therefore, these considerations should be addressed in order to apply these technologies to actual vehicles.

Further, in order to improve the fuel efficiency by reducing the friction of the drive system of the vehicle, e.g., the engine, it is necessary to rapidly increase the temperature of the engine by suitably increasing the temperature of a medium such as coolant, and further it is necessary to rapidly increase the temperature of engine oil or gear box oil.

The conventional device for recovering the exhaust heat by heat exchange between the coolant and the exhaust gas suitably increases the temperature of the coolant using the exhaust heat to increase the temperature of the engine, thereby reducing the friction and improving the fuel efficiency.

However, in order to suitably reduce the friction and improve the fuel efficiency at low temperature, it preferable to increase the temperature of the engine oil or gear box oil rather than to increase the temperature of the coolant.

This can be seen from test results for comparing the reduction in friction loss when the temperature of coolant and oil is increased. Referring to FIG. 2, for example, the reduction in friction loss is considerably increased when the oil temperature is increased rather than when the coolant temperature is increased, from which it can be seen that the heat exchange between the oil and the exhaust gas is more effective than the heat exchange between the coolant and the exhaust gas.

Accordingly, there remains a need in the art for an exhaust heat recovery device that is capable of performing heat exchange between exhaust gas, coolant, and oil by modifying the conventional exhaust heat recovery device which performs heat exchange between the exhaust gas and the coolant.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an exhaust heat recovery device which is suitably configured to perform integral heat exchange between exhaust gas discharged from an engine, coolant, and oil so as to simultaneously increase the temperature of the coolant and the oil, thereby reducing friction loss and improving fuel efficiency.

In one aspect, the present invention provides an exhaust heat recovery device that is suitably configured such that exhaust gas passes therethrough, the device preferably including a bypass pipe installed in the device and bypassing exhaust gas introduced from an exhaust pipe at an upstream side to be discharged; a coolant housing suitably installed in the device to surround the bypass pipe and including a coolant inlet port and a coolant outlet port through which coolant passes; an oil flow pipe including an oil inlet port and an oil outlet port through which oil passes and installed in the coolant housing such that heat exchange between coolant and oil is made; an exhaust flow pipe installed in the coolant housing to penetrate the interior of the coolant housing such that the exhaust gas fed into the device is heat-exchanged with the coolant and oil; and a valve device controlling the flow of the exhaust gas passing through the interior of the bypass pipe in connection with the temperature of the coolant supplied to the coolant housing or the temperature of the oil supplied to the oil flow pipe.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
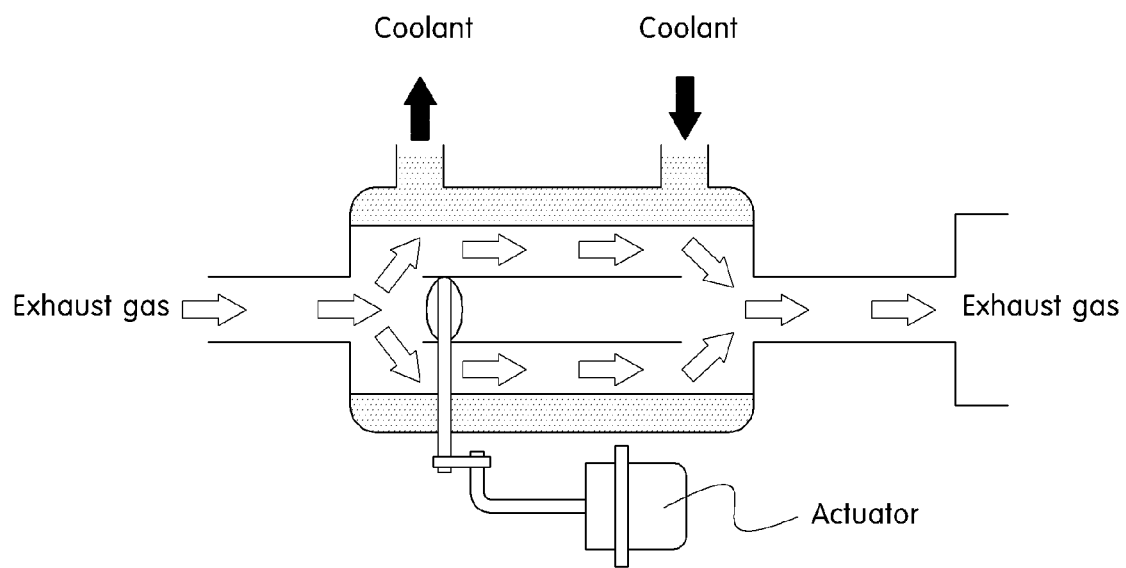
FIG. 1 is a schematic diagram of a conventional exhaust heat recovery device which performs heat exchange between coolant and exhaust gas.
Figure 2:
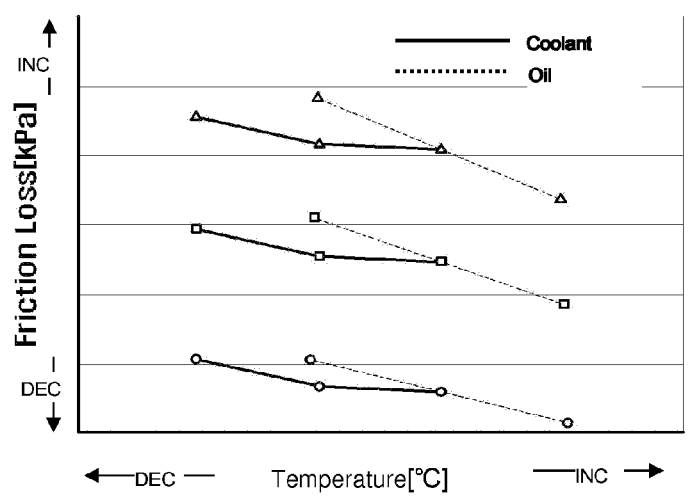
FIG. 2 is a graph comparing the reduction in friction loss when the temperature of coolant and oil is increased.

Reference numerals set forth in the Drawings includes reference to the following elements as further discussed below:

| | |
|---|---|
| 100: recovery device | 110: housing |
| 120: bypass pipe | 130: coolant housing |

-continued

| | |
|---|---|
| 141 & 142: exhaust flow pipes | 150: oil flow pipe |
| 160: valve device | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention features an exhaust heat recovery device comprising a bypass pipe, a coolant housing installed in the device to surround the bypass pipe, an oil flow pipe, an exhaust flow pipe, and a valve device.

In one embodiment, the device is configured such that exhaust gas passes therethrough.

In another embodiment, the bypass pipe is installed in the device and bypasses exhaust gas introduced from an exhaust pipe at an upstream side to be discharged.

In another embodiment, the coolant housing comprises a coolant inlet port and a coolant outlet port through which coolant passes.

In one embodiment, the oil flow pipe comprises an oil inlet port and an oil outlet port through which oil passes and is installed in the coolant housing such that heat exchange between coolant and oil is made.

In another embodiment, the exhaust flow pipe is installed in the coolant housing to penetrate the interior of the coolant housing such that the exhaust gas fed into the device is heat-exchanged with the coolant and oil.

In another embodiment, the valve device controls the flow of the exhaust gas passing through the interior of the bypass pipe in connection with the temperature of the coolant supplied to the coolant housing or the temperature of the oil supplied to the oil flow pipe.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In preferred aspects, the present invention provides an exhaust heat recovery device for recovering waste heat of exhaust gas suitably discharged from an engine by integral heat exchange between the exhaust gas, coolant, and oil (e.g., engine oil, gear box oil, or transmission oil) to simultaneously increase the coolant and oil temperature.

Accordingly, the present invention can suitably improve heating performance and fuel efficiency by the integral heat exchange between the exhaust gas, the coolant, and the oil and further reduce friction loss of a drive system such as the engine by simultaneously increasing the coolant and oil temperature.

Figure 3:
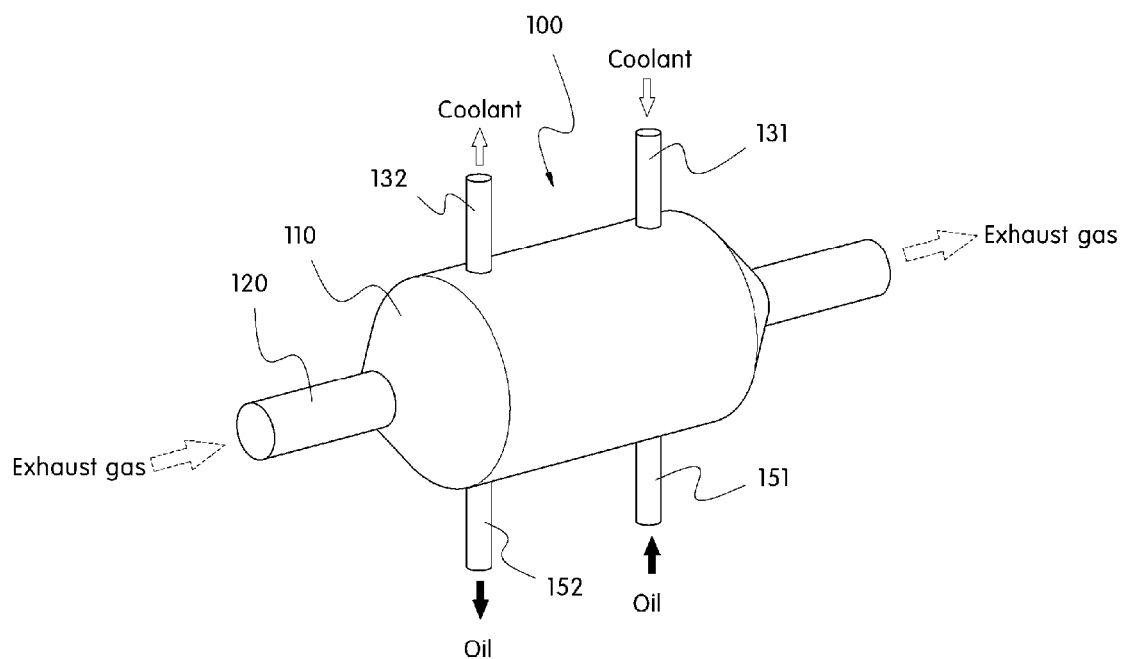
FIG. 3 is a perspective view of an exhaust heat recovery device in accordance with an exemplary embodiment of the present invention.
Figure 4:
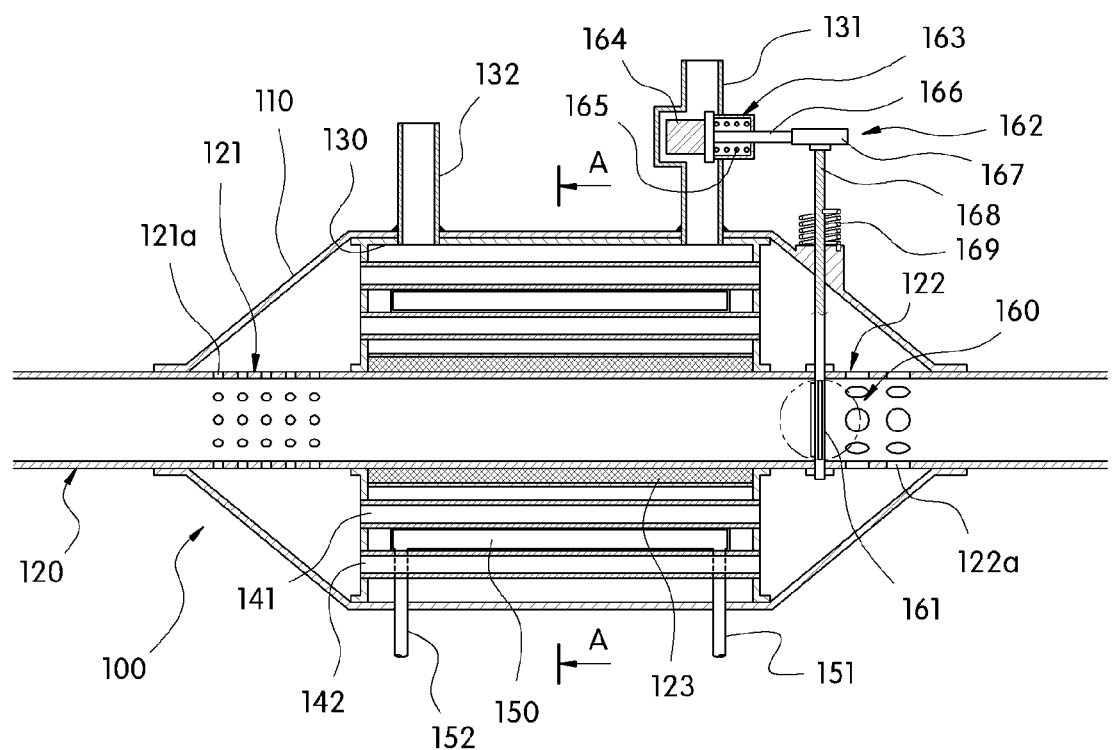
FIG. 4 is a longitudinal cross-sectional view of the exhaust heat recovery device in accordance with an exemplary embodiment of the present invention.
Figure 5:
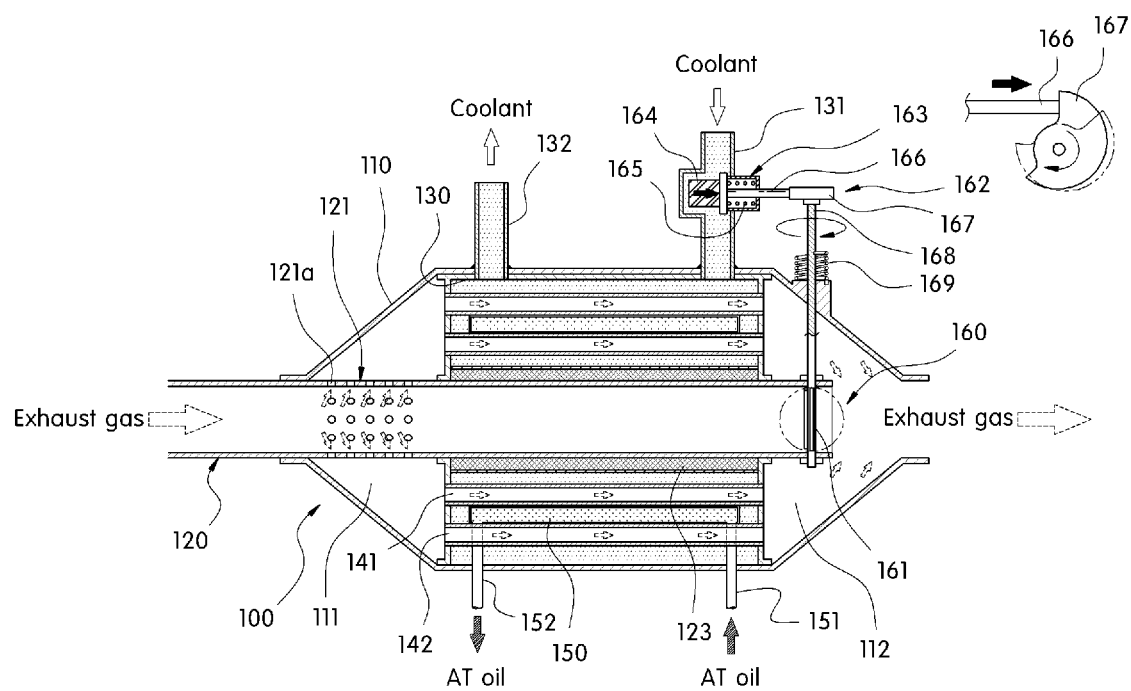
FIG. 5 is a longitudinal cross-sectional view of an exhaust heat recovery device in accordance with another exemplary embodiment of the present invention.
Figure 6:
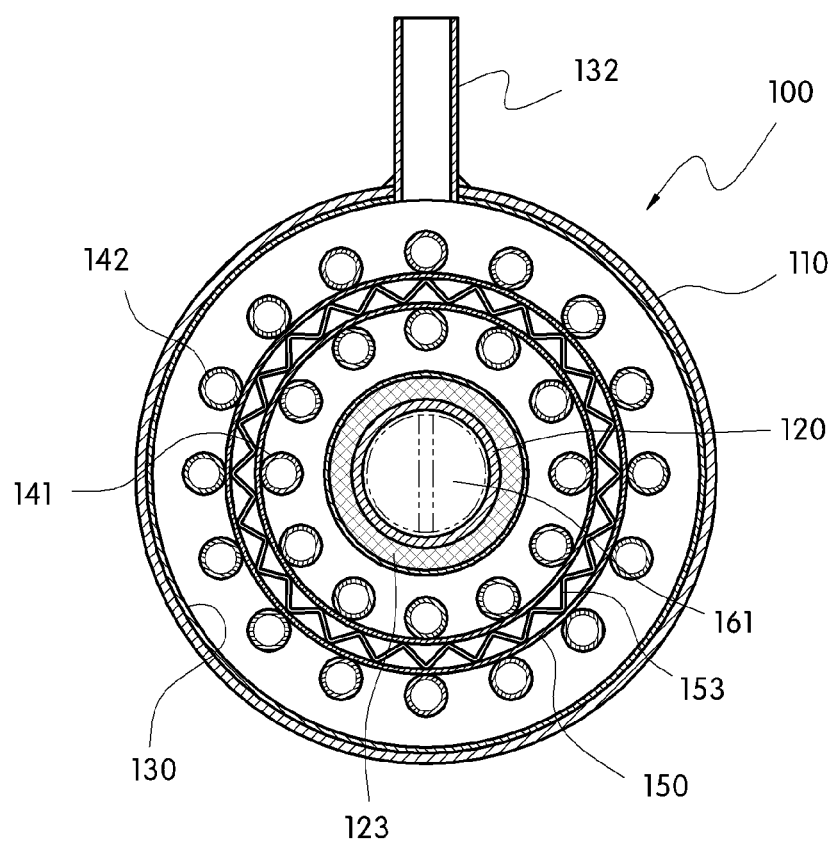
FIG. 6 is a cross-sectional view taken along line A-A of FIGS. 4 and 5.

According to certain preferred embodiments and as shown in FIGS. 3-6, for example, FIG. 3 is a perspective view of an exhaust heat recovery device in accordance with an exemplary embodiment of the present invention, FIG. 4 is a longitudinal cross-sectional view of the exhaust heat recovery device in accordance with another exemplary embodiment of the present invention, and FIG. 5 is a longitudinal cross-sectional view of an exhaust heat recovery device in accordance with another exemplary embodiment of the present invention. FIG. 6 is a cross-sectional view taken along line A-A of FIGS. 4 and 5.

Figure 7:
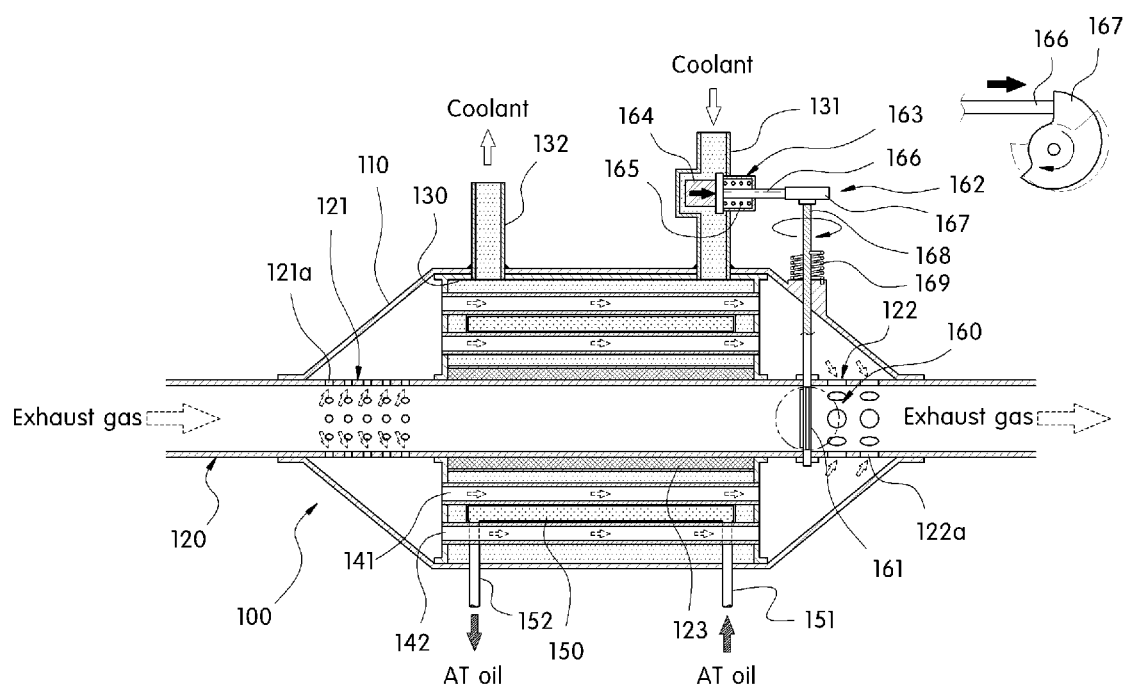
FIG. 7 is a diagram showing a state in which a valve device in accordance with the present invention is closed.
Figure 8:
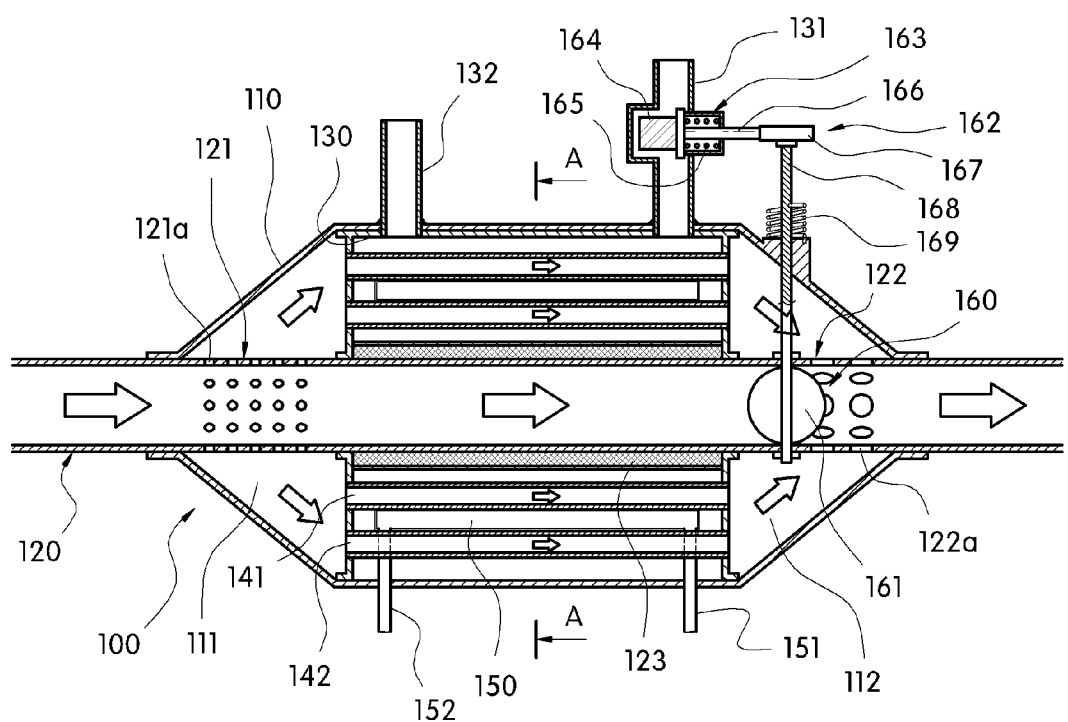
FIG. 8 is a diagram showing a state in which the valve device in accordance with the present invention starts to be opened such that exhaust gas is divided into a bypass pipe and an exhaust flow pipe.
Figure 9:
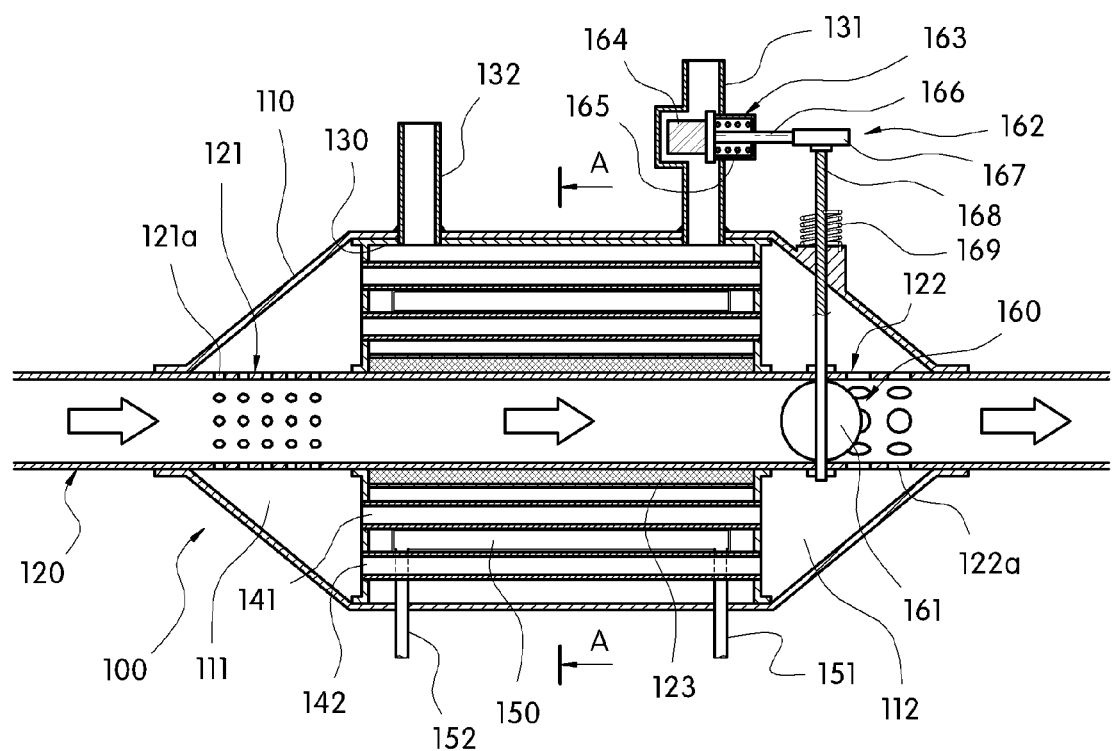
FIG. 9 is a diagram showing a state in which the valve device in accordance with the present invention is completely opened such that the introduced exhaust gas is bypassed.

According to certain preferred embodiments and as shown in FIGS. 7-9, for example, FIG. 7 is a diagram showing a state in which a valve device in accordance with preferred embodiments of the present invention is closed, FIG. 8 is a diagram showing a state in which the valve device in accordance with other preferred embodiments of the present invention starts to be opened such that exhaust gas is distributed to a bypass pipe and an exhaust flow pipe, and FIG. 9 is a diagram showing a state in which the valve device in accordance with further preferred embodiments of the present invention is completely opened such that the introduced exhaust gas is bypassed.

According to preferred embodiments, the exhaust heat recovery device of the present invention is suitably installed in an exhaust path through which the exhaust gas suitably discharged from the engine flows, preferably, in an exhaust pipe which does not suitably reduce the emission of exhaust gas. For example, the exhaust heat recovery device may be suitably installed in an exhaust pipe between an under floor catalytic converter (UCC) and a muffler.

Preferably, the exhaust heat recovery device 100 includes a housing 110 provided in an exhaust pipe (not shown) such that exhaust gas flows therethrough, a bypass pipe 120 installed in the housing 110 and connected in the middle of the exhaust pipe such that the exhaust gas introduced through the exhaust pipe at the upstream side is suitably discharged through the exhaust pipe at the downstream side without heat exchange, a coolant housing 130 suitably installed in the housing 110 to surround the bypass pipe 120 and including a coolant inlet port 131 and a coolant outlet port 132 through which coolant flowing through a coolant line is introduced and discharged, exhaust flow pipes 141 and 142 suitably installed in the coolant housing 130 to penetrate the interior of the coolant housing 130 such that the exhaust gas passing therethrough is heat-exchanged with the coolant in the coolant housing 130, an oil flow pipe 150 installed in the coolant housing 130 and preferably including an oil inlet port 151 and an oil outlet port 152, through which oil flowing through an oil line is introduced and discharged, such that the oil passing therethrough is heat-exchanged with the coolant in the coolant housing 130, and a valve device 160 for controlling the flow of the exhaust gas passing through the interior of the bypass pipe 120 in connection with the temperature of the coolant supplied to the coolant housing 130 or the temperature of the oil supplied to the oil flow pipe 150.

Accordingly, in this configuration, the housing 110 is suitably installed to surround the bypass pipe 120, thus forming a sealed space around the bypass pipe 120.

Preferably, according to certain preferred embodiments, the bypass pipe 120 is suitably connected in the middle of the exhaust pipe such that the exhaust gas flowing through the exhaust pipe passes therethrough and is suitably installed between the exhaust pipe at the upstream side and the exhaust pipe at the downstream side.

Preferably, in certain further embodiments, the bypass pipe 120 is used when there is no necessity to perform the heat exchange of the exhaust gas and is suitably arranged in the center of the housing 110 in the longitudinal (axial) direction thereof.

Further, the bypass pipe 120 preferably includes an outlet port and an inlet port, which suitably connect the internal path of the bypass pipe 120 and the internal space of the housing 110. Preferably, the outlet port and the inlet port may be suitably formed with a plurality of holes 121a and 122a, respectively, on the walls of the front and rear ends of the bypass pipe 120 such that the exhaust gas passes therethrough.

According to further preferred embodiments, the inlet port supplies the exhaust gas fed into the device, i.e., the exhaust gas fed from the exhaust pipe at the upstream side to the bypass pipe 120, to a heat exchange inlet 111 in the housing 110.

Preferably, the heat exchange inlet 111 is a space in the housing suitably connected to the exhaust flow pipes, which constitute a heat exchanger in the device, and the exhaust gas is introduced into the heat exchange inlet 111 and then passes through the exhaust flow pipes 141 and 142.

According to certain embodiments of the present invention, the outlet port is the discharge the heat-exchanged exhaust gas passing through the exhaust flow pipes 141 and 142 from a heat exchange outlet 112 in the housing 110 to the outside of the device. Preferably, the outlet port may be an outlet for discharging the exhaust gas from the heat exchange outlet 112 to the bypass pipe 120 so as to discharge the exhaust gas passing through the heat exchanger in the device and moving to the heat exchange outlet 112 to the external exhaust pipe at the downstream side of the device.

Accordingly, in certain preferred embodiments, of the present invention, the bypass pipe 120 is suitably provided with a perforated circular pipe including the plurality of holes 121a and 122a formed at the front and rear ends thereof, which are exposed to the interior of the housing 110. Hereinafter, the front end and the rear end, at which the plurality of holes 121a and 122a are suitably formed, will be referred as a front perforated pipe 121 and a rear perforated pipe 122, respectively.

Preferably, the front perforated pipe 121 is used to supply the exhaust gas, fed from the exhaust pipe at the upstream side into the front end of the bypass pipe 120, to the exhaust flow pipes 141 and 142, which constitute the heat exchanger in the device. IN certain exemplary embodiments, when the bypass pipe 120 is closed, the front perforated pipe 121 allows the exhaust gas to be fed into the heat exchange inlet 111 of the internal space in the housing 110 through the holes 121a and then pass through the heat exchanger.

According to further exemplary embodiments, the rear perforated pipe 122 is used to discharge the exhaust gas passing through the heat exchanger in the device, i.e., the exhaust gas, fed into the heat exchange outlet 112 of the internal space in the housing 110 through the exhaust flow pipes 141 and 142, to the bypass pipe 120. Preferably, the rear perforated pipe 122 is located at the rear of the flow control valve 161 such that the heat-exchanged exhaust gas is discharged from the heat exchange outlet 112 of the internal space in the housing 110 to the bypass pipe 120 through the holes 122a of the rear perforated pipe 122.

Preferably, the exhaust gas discharged through the rear perforated pipe 122 flows to the muffler through the exhaust pipe at the downstream side.

Accordingly, the front perforated pipe 121 and the rear perforated pipe 122 including the plurality of holes 121a and 122a allow the exhaust gas to receive passage resistance. In certain exemplary embodiments, the holes 121a of the front perforated pipe 121 have a size suitably smaller than that of the holes 122a of the rear perforated pipe 122 such that the exhaust gas passing therethrough encounters a large amount of resistance. For example, in certain exemplary embodiments, the holes 122a of the rear perforated pipe 122 have a size more than two times greater than that of the holes 121a of the front perforated pipe 121 to the extent that no backflow occurs.

According to other further preferred embodiments, the holes at the front end of the bypass pipe 120, which constitute the inlet port, i.e., the holes 121a of the front perforated pipe 121, are to create a flow resistance different from the main flow, and any structure such as a plurality of diaphragms, which can suitably interfere with the flow of the exhaust gas, may be used as the holes.

According to another exemplary embodiment of the present invention, although not shown in the figures, the rear perforated pipe of the bypass pipe may be suitably eliminated. That is, in certain preferred embodiments, the bypass pipe 120 does not extend to the outside of the housing 110 but is cut at the rear of the valve device 160 in the housing 110, more precisely, at the rear of the flow control valve 161. Preferably, since the bypass pipe 120 extends only to the rear of the flow control valve 161, it is not suitably connected to the exhaust pipe at the downstream side, and an end of the bypass pipe 120 cut at the rear of the flow control valve 161 is connected to the interior of the housing 110.

Accordingly, in certain preferred embodiments, instead, an outlet of the device through which the exhaust gas is finally discharged, i.e., an outlet of the housing 110 is directly connected to the exhaust pipe at the downstream side. In this case, the exhaust gas passing through the exhaust flow pipes 141 and 142 from the heat exchange inlet 111 of the internal space in the housing 110 and discharged through the heat exchange outlet 112 of the internal space in the housing 110 is directly discharged to the external exhaust pipe at the downstream side of the housing 110 through the outlet of the housing 110 at the rear of the flow control valve 161 and the bypass pipe 120.

Preferably, in preferred exemplary embodiments, the exhaust gas passing through the bypass pipe 120 is suitably discharged without any heat exchange with the coolant and the oil, and for this purpose, an insulating member 123 is suitably interposed between the outer circumferential surface of the bypass pipe 120 and the inner circumferential surface of the coolant housing 130.

Preferably, when the exhaust gas is suitably bypassed through the bypass pipe 120, the heat exchange is not required, and thus the periphery of the bypass pipe 120 is insulated such that the heat is not directly transferred from the bypass pipe 120 to the heat exchange area.

According to certain preferred exemplary embodiments, as the insulating member 123 for insulating the bypass pipe 120, an insulator may be suitably interposed between the bypass pipe 120 and the coolant housing 130 or an insulating layer, for example, an air layer may be suitably provided between the bypass pipe 120 and the coolant housing 130.

According to certain preferred embodiments, in order to form the air layer, a cylindrical sealed air chamber in which air is filled may be suitably inserted between the outer circumferential surface of the bypass pipe 120 and the inner circumferential surface of the coolant housing 130.

Preferably, the air chamber may have a double-pipe structure in which a pair of cylindrical pipes is suitably arranged in the same axis and both ends thereof are sealed to form a sealed space, in which air is filled, between the two pipes.

Meanwhile, in other exemplary embodiments, the coolant housing 130 forms an internal space through which the coolant in the housing 110 passes and is configured such that the coolant fed from the coolant line through the coolant inlet port 131 is suitably discharged to the coolant line through the coolant outlet port 132.

In another further preferred embodiment, the exhaust flow pipes 141 and 142 are suitably installed in the coolant housing 130 in the longitudinal direction thereof such that the exhaust gas passes through the coolant.

That is, according to certain exemplary embodiments, the exhaust gas, introduced into the heat exchange inlet 111 of the internal space in the housing 110 through the front perforated pipe 121, passes through the exhaust flow pipes 141 and 142 and is suitably discharged through the heat exchange outlet 112 of the internal space in the housing 110. Preferably, the exhaust flow pipes 141 and 142 are heat exchange pipes in which the heat exchange between the exhaust gas passing therethrough and the coolant passing through the interior of the coolant housing 130 is suitably performed.

Preferably, since the heat of the exhaust gas is transferred to the coolant while the exhaust gas passes through the exhaust flow pipes 141 and 142, the coolant temperature is increased, and the heated coolant is discharged through the coolant outlet port 132.

According to preferred exemplary embodiments, a plurality of exhaust flow pipes 141 and 142 are suitably installed in the coolant housing 130 and are divided into inner exhaust flow pipes 141 suitably arranged inside the oil flow pipe 150 in the circumferential direction and outer exhaust flow pipes 142 arranged outside the oil flow pipe 150 in the circumferential direction.

In certain preferred embodiments of the present invention, for example as shown in FIG. 6, the oil flow pipe 150 may be suitably installed in the coolant housing 130 such that the heat exchange between the exhaust gas, the coolant, and the oil is performed. Further, the whole or part of the exhaust flow pipes 141 and 142 may be in contact with the surface of the oil flow pipe 150.

Accordingly, in order to implement the integral heat exchange between the exhaust gas, the coolant, and the oil, the exhaust flow pipes 141 and 142 penetrate the interior of the coolant housing 130, the oil flow pipe 150 is suitably installed in the coolant housing 130, and the oil flow pipe 150 is in contact with the whole or part of the exhaust flow pipes 141 and 142.

In certain exemplary embodiments, for example, where the whole or part of the exhaust flow pipes 141 and 142 is in contact with the oil flow pipe 150, the heat can be transferred from the heated exhaust gas passing through the exhaust flow pipes 141 and 142 to the oil passing through the oil flow pipe 150 as well as the heat exchange between the oil and the coolant.

Accordingly, the waste heat of the exhaust gas, i.e., the waste exhaust heat is transferred to both the coolant passing through the coolant housing 130 and the oil passing through the oil flow pipe 150, and the exhaust heat is recovered directly by the oil, not only by the coolant, thereby more actively and effectively recovering the exhaust heat.

Preferably, the oil flow pipe 150 has a double-pipe structure in which the space between a pair of pipes is sealed in a manner similar to the air chamber and has a substantially cylindrical shape such that it can be suitably disposed between the row of the inner exhaust flow pipes 141 and the row of the outer inner exhaust flow pipes 142.

Accordingly, the oil flow pipe 150 has the double-pipe structure in which a sealed space, through which the introduced oil passes, is suitably formed between an inner pipe and an outer pipe (both ends of the inner pipe and the outer pipe are closed) such that the oil introduced from the oil line through the oil inlet port 151 passes through the sealed space between the inner pipe and the outer pipe and is discharged to the oil line through the oil outlet port 152.

Preferably, while passing through the oil flow pipe 150, the oil absorbs the heat from the exhaust gas through the coolant, and the oil heated by the exhaust heat is suitably discharged through the oil outlet port 152.

Accordingly, the exhaust flow pipes 141 and 142 and the oil flow pipe 150 are made of metal capable of performing the heat exchange to absorb the heat from the exhaust gas and correspond to a coolant/oil heat exchanger together with the coolant housing 130, in which the integral heat exchange between the exhaust gas, the coolant, and the oil is performed.

In another preferred embodiment, a heat transfer medium is filled in the internal space of the oil flow pipe 150 receiving the exhaust heat to suitably increase heat transfer performance such that the oil passes through the internal space of the heat transfer medium. For example, in certain exemplary embodiments, a fin 153 having a zigzag shape is suitably inserted and fixed to the internal space of the oil flow pipe 150 as the heat transfer medium, and the fin 153 is suitably fixed on the inner wall of the oil flow pipe 150 to improve heat exchange performance of the oil and the coolant.

According to certain preferred embodiments of the present invention, the valve device 160 is opened and closed according to whether the heat exchange is required or whether there is a driver's high power demand to control the exhaust gas passing through the bypass pipe 120. Preferably, the bypass device 160 is suitably configured to bypass the exhaust gas without heat exchange when the coolant temperature is high or to reduce the pressure of the exhaust gas at high temperature. In particular preferred embodiments, the valve device 160 is suitably configured to open and close the internal path of the bypass pipe 120 in connection with the coolant temperature.

In a preferred embodiment of the present invention, the valve device 160 may be suitably configured to control the flow of the exhaust gas passing through the bypass pipe 120 by continuously controlling the opening degree of a valve in the internal path of the bypass pipe 120 in connection with the temperature of the coolant or the oil as a heat exchange medium, not by simply opening and closing the internal path of the bypass pipe 120.

In one embodiment of the present invention, the valve device 160 preferably includes the flow control valve 161 installed to open and close the internal path of the bypass pipe 120 and a valve drive unit 162 installed to drive the flow control valve 161 to be opened and closed based on the coolant temperature.

Here, the flow control valve 161 may be opened to ensure the basic performance of the engine even when the pressure of the exhaust gas is suitably applied to the interior of the bypass pipe 120 is above a predetermined level.

That is, in one exemplary embodiment, the flow control valve 161 is suitably installed in the bypass pipe 120 to rotate with respect to a drive shaft 168 and, when it rotates with respect to the drive shaft 168, it opens and closes the internal path of the bypass pipe 120.

Preferably, in the valve device 160 as shown in the figures, when the amount of exhaust gas is sharply increased under the full load condition of the engine, the flow control valve 161 is suitably rotated and opened by overcoming the spring force of a spring member 169 installed on the drive shaft 168 with a difference in pressure of the exhaust heat recovery device 100 and with the exhaust pressure applied thereto.

In other preferred embodiments, when the exhaust pressure is removed, the drive shaft 168 is suitably rotated in the opposite direction by the elastic force of the spring member 169 to maintain the flow control valve 161 in a closed state.

Accordingly, with the automatic opening function based on the exhaust pressure, the flow control valve 161 has a fail safe function.

According to certain preferred embodiments of the present invention, the valve drive unit 162 comprises a thermostat 163 including a pallet 164, suitably installed in the path of the coolant fed through the coolant inlet port 131 and having wax expanding and contracting in response to the coolant temperature, and a spindle 166 moving forward and backward during the expansion and contraction of the wax, a rotating plate 167 suitably connected to the spindle 166 of the thermostat 163 and rotated during the forward and backward movement of the spindle 166, and the drive shaft 168 integrally connected to the flow control valve 161 and receiving the rotational force of the rotating plate 167 to open and close the flow control valve 161.

Preferably, the valve drive unit 162 further comprises the spring member 169 for elastically restoring the drive shaft 168 to maintain the flow control valve 161 (e.g. a flap valve) in a closed state. According to certain preferred embodiments, the spring member 169 may be a coil spring suitably disposed between the drive shaft 168 and the outer wall of the housing 110.

Preferably, the thermostat 163 of the valve drive unit 162 is a device widely used in engine coolant circulation systems, and thus its detailed description will be omitted.

According to certain exemplary embodiments of the present invention as described herein, the thermostat 163 comprises the pallet 164 having the wax, the spindle 166 moving forward and backward during the expansion and contraction of the wax, and a coil spring 165 for restoring the spindle 166 moving forward by the expansion of the wax. Preferably, the pallet 164 is inserted into the path through which the coolant passes to operate in response to the coolant temperature.

According to further preferred embodiments, the rotating plate 167 is integrally connected to the top of the drive shaft 168 to rotate together with the drive shaft 168 and includes a projection 167a pushed by the spindle 165 to rotate.

Preferably, when the spindle 166 moves forward to apply a force to the projection 167a, the rotating plate 167 and the drive shaft 168 are rotated together to open the flow control valve 161.

As a result, when the coolant temperature is suitably increased after the warm-up of the coolant, the spindle 166 of the thermostat 163 moves forward to rotate the rotating plate 167, and thereby the drive shaft 168 and the flow control valve 161 are rotated together to open the bypass pipe 120.

That is, when the exhaust gas is directly discharged through the bypass pipe 120 without heat exchange, the heat exchange with the exhaust gas is terminated, and only the heat exchange between the coolant and oil is made.

Moreover, as mentioned above, the flow control valve 161 suitably opens the bypass pipe 120 when the pressure of the exhaust gas applied to the interior of the bypass pipe 120 is above a predetermined level.

Although the configuration of the valve device 160 which operates in connection with the temperature of the coolant is described above, the valve device 160 may be configured to operate in connection with the temperature of the oil, instead of the coolant.

Accordingly, in certain preferred embodiments, the valve device 160 may be suitably configured in the same manner as described above except that the thermostat 163 is installed in the path of the oil fed through the oil inlet port 151, not in the path of the coolant fed through the coolant inlet port 131.

Accordingly, in the present invention, the valve device 160 may be suitably configured to control the flow of the exhaust gas in connection with the temperature of the coolant or that of the oil as a heat exchange medium.

Next, the operation state of the exhaust heat recovery device according to the present invention is described with respect to the control state of the valve device.

According to certain preferred embodiments of the present invention, as shown in FIG. 7 for example, in a state where the valve device 160 is closed, all of the exhaust gas fed from the exhaust pipe at the upstream side into the interior of the exhaust heat recovery device 100 is introduced into the heat exchange inlet 111 in the device through the holes 121*a* at the inlet of the bypass pipe 120, passes through the exhaust flow pipes 141 and 142 to the heat exchange outlet 112 in the device, is introduced into the bypass pipe 120 through the holes 122*a* at the outlet of the bypass pipe 120, and is then discharged to the outside of the device, i.e., to the exhaust pipe at the downstream side.

Accordingly, heat exchange between the exhaust gas passing through the exhaust flow pipes 141 and 142 and the coolant passing through the coolant housing 130, heat exchange between the coolant passing through the coolant housing 130 and the oil passing through the oil flow pipe 150, and heat exchange between the exhaust gas passing through the exhaust flow pipes 141 and 142 and the oil passing through the oil flow pipe 150 are made, and thereby the heat of the exhaust gas is suitably transferred to the coolant and the oil.

Preferably, when an end of the bypass pipe 120 is cut at the rear of the flow control valve 161 of the valve device 160 and suitably connected to the interior of the device, the heat-exchanged exhaust gas passing through the heat exchanger in the device (where the heat exchange is made, such as the exhaust flow pipes, the coolant housing, and the oil flow pipe) and moved to the heat exchange outlet does not pass through the bypass pipe 120 but is directly discharged to the exhaust pipe at the downstream side through the outlet of the housing 110 (see FIG. 5).

In another further preferred embodiments, for example as shown in FIG. 8, when the valve device 160 starts to be opened as the thermostat 163 operates by an increase in coolant temperature, the exhaust gas introduced into the exhaust heat recovery device 100 is suitably distributed to the bypass pipe 120 and the exhaust flow pipes 141 and 142 and flows therethrough.

Subsequently, for example as shown in FIG. 9, when the warm-up step is completed as the coolant temperature increases, the valve device 160 is completely opened, and thus all of the exhaust gas is suitably discharged to the exhaust pipe at the downstream side through the bypass pipe 120 without heat exchange.

Accordingly, when the warm-up is completed, the exhaust gas does not pass through the heat exchanger in the device but is bypassed by the bypass pipe 120, and thereby only heat exchange between the coolant and the oil is made.

Further, even when the force generated by the back pressure of the exhaust gas is greater than the force of the spring member 169 connected to the valve device 160, the valve device 160 is suitably opened such that the exhaust gas flows as shown in FIG. 8 or 9.

In the exhaust heat recovery device according to the present invention, the oil may be engine oil, gear box oil, or transmission oil, and in the case where the gear box oil or the transmission oil is heat-exchanged with the exhaust gas, the power transmission efficiency can be suitably improved.

As described herein, according to the exhaust heat recovery device of the present invention which is configured to perform the integral heat exchange between the exhaust gas, the coolant, and the oil, it is possible to simultaneously increase the temperature of the coolant and the oil, thereby suitably reducing the friction loss and improving the fuel efficiency.

Accordingly, since the exhaust heat is recovered using the coolant and the oil, it is possible to increase energy recovery efficiency.

Further, since the exhaust heat recovery device of the present invention can suitably improve the fuel efficiency and heating performance and ensure stable heat exchange with respect to the gear box oil through the integral heat exchange between the exhaust gas, the coolant, and the oil, it is possible to substitute for a conventional automatic transmission fluid (ATF) warmer using coolant. Preferably, in the case where the automatic transmission oil is passed through the exhaust heat recovery device of the present invention, it is possible to substitute for the conventional ATF warmer and improve the power transmission efficiency of the automatic transmission.

Accordingly, since the exhaust heat recovery device of the present invention recovers the waste heat of the exhaust gas, of which temperature is most rapidly increased, using the coolant and the oil, the heat exchange effect is suitably increased, and thus it is possible to more effectively recover the exhaust heat, compared to the conventional ATF warmer.

Furthermore, since the coolant absorbs heat in the conventional ATF warmer, the friction loss of the engine may be increased by the reduction of coolant temperature. However, according to the exhaust heat recovery device of the present invention, it is possible to suitably improve the power transmission efficiency and, at the same time, reduce the friction loss.

Further, in certain exemplary embodiments where the conventional ATF warmer is used, the heat is absorbed from the coolant to increase the temperature of oil, and thereby the heating performance may be reduced. However, according to the exhaust heat recovery device of the present invention, the coolant and the oil are heated together, and thereby the heating performance is improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An exhaust heat recovery device configured so that exhaust gas passes therethrough, the device comprising:
   a bypass pipe installed in the device and bypassing exhaust gas introduced from an exhaust pipe at an upstream side to be discharged;
   a coolant housing installed in the device to surround the bypass pipe and including a coolant inlet port and a coolant outlet port through which coolant passes;
   an oil flow pipe including an oil inlet port and an oil outlet port through which oil passes and installed in the coolant housing such that heat exchange between coolant and oil is made; and
   a plurality of exhaust flow pipes installed in the coolant housing to penetrate the interior of the coolant housing such that the exhaust gas fed into the device is heat-exchanged with the coolant and oil, wherein a valve device controls the flow of the exhaust gas passing through the interior of the bypass pipe in connection with the temperature of the coolant supplied to the coolant housing or the temperature of the oil supplied to the oil flow pipe, and wherein the plurality of exhaust flow pipes are arranged parallel to the oil flow pipe which is parallel to the bypass pipe, wherein the oil flow pipe includes a heat transfer medium filled within an internal space thereof so that oil passes therethrough to increase heat transfer performance, and the exhaust flow pipes include an inner exhaust flow pipe arranged inside the oil flow pipe and an outer exhaust flow pipe arranged outside the oil flow pipe, wherein the rotating plate is integrally connected to a top of a drive shaft and includes a projection pushed by a spindle of a thermostat to rotate when the spindle moves forward, and wherein the drive shaft includes a spring member for rotating a flow control valve via an elastic force in order to be maintained in a closed state and the flow control valve is a flap valve rotating together with the drive shaft to be opened when an exhaust pressure above a predetermined level is applied in the bypass pipe.

2. The exhaust heat recovery device of claim 1, wherein the bypass pipe comprises an inlet port through which the exhaust gas fed into the bypass pipe is introduced into a heat exchange inlet in the device connected to the exhaust flow pipe such that the exhaust gas is supplied to the exhaust flow pipe and an outlet port through which the exhaust gas is discharged from a heat exchange outlet to the interior of the bypass pipe such that the exhaust gas passing through the exhaust flow pipe is discharged from the heat exchange outlet in the device to an exhaust pipe at a downstream side through the bypass pipe.

3. The exhaust heat recovery device of claim 2, wherein each of the outlet port and the inlet port comprises a plurality of holes formed in the bypass pipe.

4. The exhaust heat recovery device of claim 3, wherein the holes, which constitute the inlet port, have a size smaller than the holes, which constitute the outlet port, such that the resistance of the exhaust gas is increased at the outlet port rather than the outlet port.

5. The exhaust heat recovery device of claim 1, wherein the bypass pipe comprises an inlet port through which the exhaust gas fed into the bypass pipe is introduced into a heat exchange inlet in the device connected to the exhaust flow pipe such that the exhaust gas is supplied to the exhaust flow pipe and an end of the bypass pipe is cut at the rear of the valve device and connected to the interior of the device such that the exhaust gas passing through the exhaust flow pipe is directly discharged from a heat exchange outlet of the device to an external exhaust pipe at a downstream side of the device.

6. The exhaust heat recovery device of claim 1, further comprising an insulating member interposed between the bypass pipe and the coolant housing.

7. The exhaust heat recovery device of claim 1, wherein the whole or part of the exhaust flow pipes installed in the coolant housing is in contact with the surface of the oil flow pipe such that direct heat exchange between the exhaust gas passing through the exhaust flow pipe and the oil passing through the oil flow pipe is made.

8. The exhaust heat recovery device of claim 1, wherein the oil is an engine oil or an automatic transmission oil.

9. The exhaust heat recovery device of claim 1, wherein the valve device comprises a flow control valve for controlling the flow of the exhaust gas flowing through the internal path of the bypass pipe and a valve drive unit for driving the flow control valve based on the temperature of the coolant, the valve drive unit including a thermostat installed in the path of the coolant fed through the coolant inlet port or in the path of the oil fed into the oil inlet port, a rotating plate connected to a spindle of the thermostat and rotated during forward and backward movement of the spindle based on the temperature of the coolant or the oil, and a drive shaft connected to the flow control valve and receiving the rotational force of the rotating plate to operate the flow control valve.

10. An exhaust heat recovery device comprising:
a bypass pipe;
a coolant housing installed in the device to surround the bypass pipe;
an oil flow pipe;
a plurality of exhaust flow pipes; and
a valve device,
wherein the plurality of exhaust flow pipes are arranged parallel to the oil flow pipe which is parallel to the bypass pipe, and
wherein the oil flow pipe includes a heat transfer medium filled within an internal space thereof so that oil passes therethrough to increase heat transfer performance, and the exhaust flow pipes include an inner exhaust flow pipe arranged inside the oil flow pipe and an outer exhaust flow pipe arranged outside the oil flow pipe.

11. The exhaust heat recovery device of claim 10, wherein the device is configured such that exhaust gas passes therethrough.

12. The exhaust heat recovery device of claim 10, wherein the bypass pipe is installed in the device and bypasses exhaust gas introduced from an exhaust pipe at an upstream side to be discharged.

13. The exhaust heat recovery device of claim 10, wherein the coolant housing comprises a coolant inlet port and a coolant outlet port through which coolant passes.

14. The exhaust heat recovery device of claim 10, wherein the oil flow pipe comprises an oil inlet port and an oil outlet port through which oil passes and is installed in the coolant housing such that heat exchange between coolant and oil is made.

15. The exhaust heat recovery device of claim 10, wherein the exhaust flow pipe is installed in the coolant housing to penetrate the interior of the coolant housing such that the exhaust gas fed into the device is heat-exchanged with the coolant and oil.

16. The exhaust heat recovery device of claim 13, wherein the valve device controls the flow of the exhaust gas passing through the interior of the bypass pipe in connection with the temperature of the coolant supplied to the coolant housing or the temperature of the oil supplied to the oil flow pipe.

17. The exhaust heat recovery device of claim 10, wherein the drive shaft includes a spring member for rotating a flow control valve via an elastic force in order to be maintained in a closed state and the flow control valve is a flap valve rotating together with the drive shaft to be opened when an exhaust pressure above a predetermined level is applied in the bypass pipe.

18. The exhaust heat recovery device of claim 10, wherein the rotating plate is integrally connected to a top of a drive shaft and includes a projection pushed by a spindle of a thermostat to rotate when the spindle moves forward.

* * * * *